(12) United States Patent
Pollmer

(10) Patent No.: US 9,562,972 B2
(45) Date of Patent: Feb. 7, 2017

(54) METHOD FOR ASCERTAINING A DISTANCE OF AN OBJECT FROM A MOTOR VEHICLE USING A PMD SENSOR

(71) Applicant: Audi AG, Ingolstadt (DE)

(72) Inventor: Jens Pollmer, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/769,743

(22) PCT Filed: Jan. 15, 2014

(86) PCT No.: PCT/EP2014/000082
§ 371 (c)(1),
(2) Date: Aug. 21, 2015

(87) PCT Pub. No.: WO2014/131483
PCT Pub. Date: Sep. 4, 2014

(65) Prior Publication Data
US 2015/0369919 A1 Dec. 24, 2015

(30) Foreign Application Priority Data
Feb. 26, 2013 (DE) .................. 10 2013 003 186

(51) Int. Cl.
*G01C 3/08* (2006.01)
*G01S 17/36* (2006.01)
(Continued)

(52) U.S. Cl.
CPC ............... *G01S 17/36* (2013.01); *G01S 7/487* (2013.01); *G01S 7/4865* (2013.01); *G01S 17/10* (2013.01); *G01S 17/89* (2013.01); *G01S 17/936* (2013.01)

(58) Field of Classification Search
CPC ........ G01S 17/36; G01S 7/4865; G01S 7/487; G01S 17/10; G01S 17/89; G01S 17/936
See application file for complete search history.

(56) References Cited

U.S. PATENT DOCUMENTS

| 3,298,024 A | 1/1967 | Böhm |
| 3,652,161 A | 3/1972 | Ross |
| (Continued) | | |

FOREIGN PATENT DOCUMENTS

| AT | 355 096 | 5/1979 |
| DE | 100 39 422 | 2/2002 |
| (Continued) | | |

OTHER PUBLICATIONS

Ringbeck, Dr.-Ing. Thorston and Dipl.-Ing. Biance Hagebeuker. "A 3D Time of Flight Camera for Object Detection." Optical 3-D Measurement Techniques, Plenary Session 1: Ranging Imaging I. Zurich. (Jul. 9-12, 2007).*

(Continued)

*Primary Examiner* — Luke Ratcliffe
*Assistant Examiner* — Samantha K Abraham
(74) *Attorney, Agent, or Firm* — Henry M. Feiereisen LLC.

(57) ABSTRACT

A method to determine a distance of an object to a motor vehicle using a PMD sensor, includes measuring a phase shift of a measurement signal reflected on the object for at least one modulation frequency, the modulation frequency is selected so that in a detection range beginning at the motor vehicle a distance is unambiguously determinable from the phase shift; performing a runtime measurement for an individual signal reflected on the object during a time interval beginning at a first time point where the individual signal is emitted and ending at a second time point corresponding to a time required by the individual signal to travel twice the detection range when the reflected individual signal is measured during the time interval, determining a distance from the phase shift; and when the reflected individual signal is not measured during the time interval, discarding the phase shift without determining a distance.

8 Claims, 3 Drawing Sheets

(51) Int. Cl.
*G01S 17/89* (2006.01)
*G01S 7/487* (2006.01)
*G01S 17/10* (2006.01)
*G01S 7/486* (2006.01)
*G01S 17/93* (2006.01)

(56) References Cited

U.S. PATENT DOCUMENTS

| | | |
|---|---|---|
| 3,730,628 A | 5/1973 | Wolcott et al. |
| 5,745,437 A | 4/1998 | Wachter et al. |
| 2004/0100626 A1 | 5/2004 | Gulden et al. |
| 2010/0292886 A1* | 11/2010 | Szczerba ............. G01C 21/365 701/31.4 |
| 2011/0188028 A1 | 8/2011 | Hui et al. |
| 2012/0257186 A1 | 10/2012 | Rieger et al. |

FOREIGN PATENT DOCUMENTS

| | | | |
|---|---|---|---|
| DE | 103 54 714 | 6/2005 | |
| DE | 102010003409 | 9/2011 | |
| DE | 102010003409 A1 * | 9/2011 | ............... G01J 9/00 |
| WO | WO 01/55746 | 8/2001 | |

OTHER PUBLICATIONS

International Search Report issued by the European Patent Office in International Application PCT/EP2014/000082 on Apr. 2, 2014.

* cited by examiner

METHOD FOR ASCERTAINING A DISTANCE OF AN OBJECT FROM A MOTOR VEHICLE USING A PMD SENSOR

CROSS-REFERENCES TO RELATED APPLICATIONS

This application is the U.S. National Stage of International Application No. PCT/EP2014/000082, filed Jan. 15, 2014, which designated the United States and has been published as International Publication No. WO 2014/131483 and which claims the priority of German Patent Application, Serial No. 10 2013 003 186.9, filed Feb. 26, 2013, pursuant to 35 U.S.C. 119(a)-(d).

BACKGROUND OF THE INVENTION

The invention relates to a method for ascertaining a distance of an object from a motor vehicle using a PMD sensor and a PMD sensor.

PMD sensors (Photonic Mixing Device-Sensor) are well-known in the art as optical sensors, whose functional principle is based on the time-of-flight-principle (time of flight). A measuring signal emitted from a signal source is reflected at an object and is received again by a signal detector. Hereby, light-measuring signals, modulated by a modulation frequency, are usually used, wherein a phase shift is determined by comparing the emitted and the received measuring signal. From this phase shift, distances to the object can be calculated, albeit with ambiguity, because since the phase shift is considered, each distance that is modified by a multiple of the modulation wave length associated with the modulation frequency results in the same phase shift.

The use of low modulation frequencies is usually not desired because even though long wavelengths are present, the measurement and thus the duration of a measurement cycle is significantly prolonged, so that distance measurements are not available at the desired frequency. The use of high frequencies, however, offers many advantages because the overall efficiency of the PMD sensor increases with increasing frequency. Especially the local resolution and range of the measuring signal can be enhanced. However, higher frequencies pose the problem that a detection range, which begins at the motor vehicle, and within which an unambiguous determination of a distance based on the phase shift is possible, is correspondingly shorter. A further problem is that, at usual illumination intensities that are adjusted to such a detection range or definiteness range, highly reflective objects, e.g. so-called retro-reflectors, may still generate a signal at greater distances which, when only considering the closest possible distance, may generate an erroneous signal due to the phase shift.

To solve this problem in applications using great detection ranges it was proposed to expand the detection range by combining multiple frequencies. Hereby, the measuring signal is modulated within a measurement cycle by several different modulation frequencies, for example three modulation frequencies, and phase shifts are correspondingly determined for each modulation frequency. From these phase shifts multiple possible distances result as described above. Only distances that were determined for all phase shifts are possible solutions so that, depending on the selection of the different modulation frequencies, the detection range within which an unambiguous identification of a distance is possible can be expanded.

However, this solution has the disadvantage that due to the number of modulation frequencies, the time until a reliable (unambiguous) identification of a distance to an object is determined by the required exposure times. This significantly prolongs the measurement cycle. In addition this solution is limited by the selection of the possible frequencies, particularly by the upper maximum frequency. This limitation prevents the optimal combination of amount of light and modulation frequency.

SUMMARY OF THE INVENTION

It is therefore an object of the invention to provide a possibility for ascertaining a distance with a PMD sensor, which, while using high modulation frequencies, allows definiteness and increased flexibility regarding the configuration of the concrete measuring process without excessively extending the duration of the measuring cycle.

To achieve this object, a method of the aforementioned kind includes the following steps:

in a measurement cycle, measuring a phase shift of a measurement signal reflected on the object for at least one modulation frequency, wherein the modulation frequency is selected so that a distance can be unambiguously determined from the phase shift within a detection range beginning at the motor vehicle, and performing a runt-time measurement for an individual signal reflected on the object during a time interval beginning with the transmission of the individual signal and ending at a time point that corresponds to traversing the detection range twice, when a reflected individual signal was measured during the time interval, determining the distance from the phase shift, when no reflected individual signal was measured during the time interval, discarding the phase shift without determining a distance.

The basic idea of the present invention is to further include a type of "sonar"-process in the previous determination of a distance, which only ensures the definiteness for one detection range. Thereby, no higher requirements have to be met for the runtime measurement, because the runtime measurement only serves to ensure that a signal, detected during the measurement of the phase shift, actually lies within the detection range. A measurement cycle is therefore proposed in which, in addition to the classic modulation scheme and measurement of the measuring signal, an additional light pulse, the individual signal, is emitted by the existing signal source (PMD-illuminating device). During a specifically selected time interval, it is verified whether the individual signal, which may include one or more pulses, was received again. When a PMD sensor with multiple pixels is used, this measurement cycle is of course carried out for all pixels. In this way, those pixels may be identified, whose measurement value for the phase shift originates from the relevant detection range.

Hereby, as mentioned above, it is not necessary to exactly determine the distance through the runtime measurement, so that conventional PMD sensors can be used without (excessively) altering the architecture. After measured phase shifts, for which no reflection of the individual signal was measured within the time interval, have been discarded the distance range following the detection range is ultimately faded out, wherein the time interval has to be dimensioned accordingly. For example, to unambiguously determine a distance $t_{max}$ for a given detection range it can be deduced from the known relationship $t_{max} = t_{max} \cdot c \cdot 2$ that the extension of the time interval has to be $$t_{max}=t_{max}/(2 \cdot c).$$

For example, a detection range of 50 m results in a time interval of 83 ns.

Assuming that a length of the detection range, i.e., $x_{max}$, is predetermined as design criterion for a PMD-sensor, reflections that lie outside this range can be faded out by the additional runtime measurement in a targeted manner. The definiteness that results from the at least one modulation frequency, may thus be specifically limited to the detection range, so that when for example using multiple modulation frequencies, the definiteness may be significantly increased, which offers the advantages mentioned above. Alternatively, the definiteness within the detection range may be achieved by fewer modulation frequencies, in particular by only one modulation frequency, so that the duration of a measurement cycle can be significantly reduced. Overall, the operating procedure according to the invention for a PMD sensor for measuring the distance to at least one object significantly increases flexibility regarding the construction of the entire system. Using a smaller number of modulation frequencies leads to shorter measurement cycles. In addition, exposures can be avoided thereby allowing to reduce the time during which the LEDs, which are often provided in the signal sources, are exposed to stress. This for example enables a stronger pulse power of the LEDs, so that increased detection ranges of the system can be achieved. On the other hand, using multiple modulation frequencies also makes it possible to increase the system frequencies, and thereby improving efficiency and local resolution.

In a further embodiment of the present invention, it can be provided that the time point defining the end of the time interval is determined by taking measurement uncertainties and a predetermined target detection range into account, so that a distance range defined by the standard deviations, lies outside of, and in particular adjoins, the target detection range that lies within the detection range. As already mentioned, it is not necessary within the scope of the present invention to accomplish a high-precision runtime measurement because the latter ultimately only serves to fade out unwanted distance ranges. When for example, a target detection range is predetermined as a design criterion, within which an unambiguous distance determination is to be achieved, the detection range and the time interval can be selected so that the number of measurement errors is kept very low. When for example a target detection range of 50 m is demanded, the inaccuracy of the runtime measurement, defined by the standard deviation, is +/−5 m, and it is expedient to select a detection range of 55 m, because in this case the distance range defined by the standard deviation extends the target detection range by the maximal unambiguously determinable distance.

As mentioned above, it can be advantageous in specific embodiments of the present invention when phase shifts are measured for more than one modulation frequency. Thereby, different possibilities for using further measured phase shifts are conceivable.

On one hand, it is possible to use at least two of the modulation frequencies for defining the detection range. In this way, advantageously very high frequencies can be selected so that when using at least two different modulation frequencies, a sufficiently great detection range within which a distance can be unambiguously determined by the phase shifts can still be achieved. As described above, this is the possible value for the distances that is consistent within the detection range, which distances can be calculated from the individual phase shifts.

Alternatively or additionally it is also possible that at least one of the modulation sequences is used for validating a distance that is determined from the phase shifts of the other modulation frequencies. It is also conceivable to use at least one modulation frequency, and with this a measured phase shift, to additionally validate a value for the distance determined from the at least one other phase shift in order to further enhance the reliability of the measurement.

In an advantageous embodiment of the subject matter of the invention, an amplitude of the individual signal is measured in the runtime measurement, wherein the amplitude is taken into account in the exposure control when emitting the measurement signal. In this embodiment, the amplitude of the received individual signal is thus considered, from which advantageously conclusions can be drawn regarding the exposure control. In this way, the required exposures (i.e., measurements) can for example be further reduced.

In addition to the process, the present invention also relates to a PMD sensor, which has a control device to implement the process according to the invention. As usual, a signal source (PMD-illumination system) is provided, which may include one or more LEDs, or also other suitable light sources, and which can emit measurement signals and individual signals in particular for different pixels of the PMD sensor. A detection device, for example a camera, serves to receive reflected signals. All embodiments with regard to the method according to the invention analogously also apply to the PMD sensor according to the invention, with which the mentioned advantages can also be achieved.

BRIEF DESCRIPTION OF THE DRAWING

Further advantages and details of the present invention will become apparent from the embodiments described below and from the drawing. It is shown in.

DETAILED DESCRIPTION OF PREFERRED EMBODIMENTS

Figure 1:
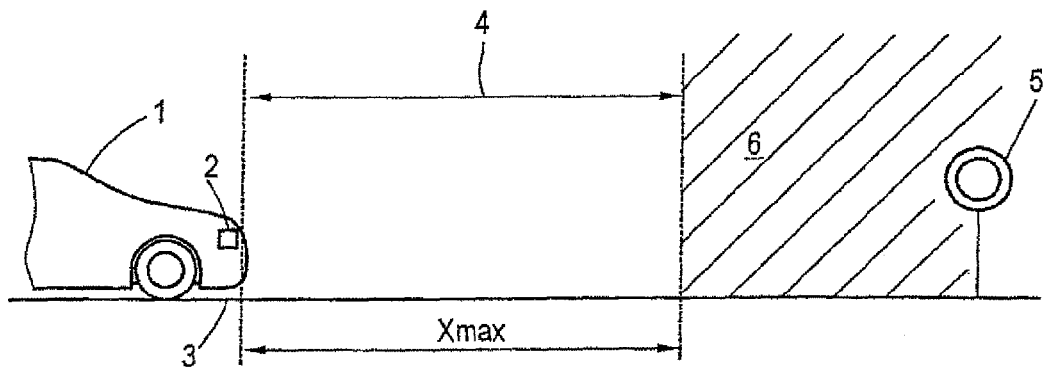
FIG. 1 a schematic diagram illustrating the functioning of the method according to the invention, FIG. 2 a flow chart of the method according to the invention, FIG. 3 an exemplary measurement cycle of the method according to the invention, FIG. 4 a schematic diagram illustrating the runtime measurement and its evaluation, FIG. 5 a simplified schematic diagram, of a PMD sensor according to the invention, FIG. 6 a graphical illustration, showing the relationship of the time interval as a function of the desired predetermined target detection range.

The principle of the present invention is first explained in more detail with reference to FIG. 1. There, a motor vehicle 1 having a PMD sensor 2 is shown on a route 3. The PMD sensor 2 measures phase shifts of a measuring signal modulated with at least one modulation frequency, which is emitted by a corresponding signal source, for example including an LED or another PMD-applicable light source, and is received again by a detection device, for example a camera. It is common to select the at least one modulation frequency so that the distance determined from the at least one phase shift assigned to the at least one modulation frequency is unambiguous within a detection range 4. The illumination of the area in front of the motor vehicle 1 by the signal source can then be adjusted so that at least from common objects none or nearly no reflection signals are emitted outside of the detection range 4. Nonetheless highly reflective objects exist, for example retro-reflectors 5, which can transmit a reflecting measurement signal over long distances, such as from distances of 500-700 m. Therefore, the process for operating the PMD sensor 2 according to the invention provides, in addition to the common phase shift measurements, a runtime measurement with an individual signal, which is only used to exclude exclusion ranges 6, shown hatched in FIG. 1, that lie outside of the detection range 4, This possibility, to specifically exclude exclusion ranges 6 from observation, increases the flexibility for configuring the phase shift measurement using the measurement signals. The exclusion range 6 is faded out so that the demands on definiteness only exist with regard to the detection range 4, which includes the target detection range, so that for example, fewer modulation frequencies may be employed, higher modulation frequencies may be used and the like.

Figure 2:
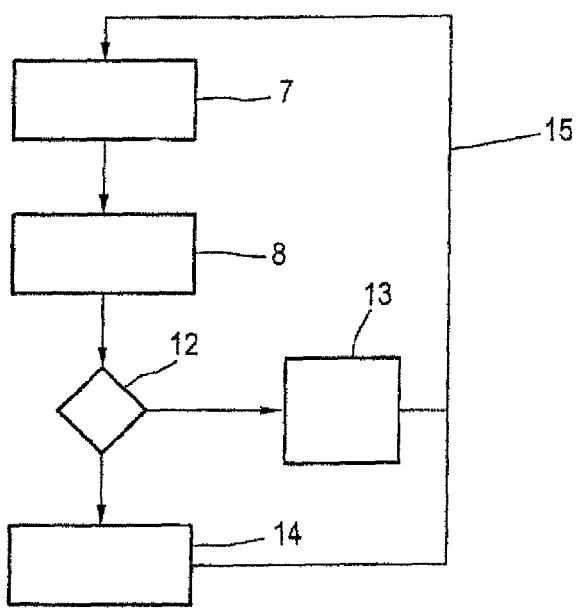

FIG. 2 shows a flow chart of the method according to the invention to measure the distance to an object. Usually PMD sensors 2 have a large number of individual pixels, for each of which the process according to the invention is of course carried out, which is explained in more detail below.

In a step 7, as generally known, the phase shifts are measured, by modulating a measurement signal with at least one modulation frequency and emitting the signal. The reflected measurement signal is correspondingly received and a phase shift is determined. From the phase shift for each used modulation frequency, a distance within the detection range 4 can be unambiguously determined as explained.

In a step 8 a runtime measurement is performed so that an individual signal, which may include one or more pulses, is emitted from the signal source.

Then, however, an exact time period is not measured, but rather it is checked whether a reflection, i.e., a reflected individual signal, is received back within a defined time interval since the individual signal was emitted. The duration of the time interval is ultimately determined by way of the detection range 4 so that, for example when the detection range 4 has an extent $x_{max}$, see FIG. 1, the duration of the time interval results according to the known runtime relations for electromagnetic radiation as $t_{max}=t_{max}/(2 \cdot c)$. For $t_{max}=50$ m a duration of the time interval is hereby 83 ns.

Since no precise time measurements are necessary, but only a time interval is observed, the requirements regarding definiteness of the runtime measurement and synchronization are relatively low. Inaccuracies that occur within the scope of the runtime measurement can be corrected by a corresponding adjustment of the time interval and the detection range 4 with regard to the target detection range.

Figure 3:
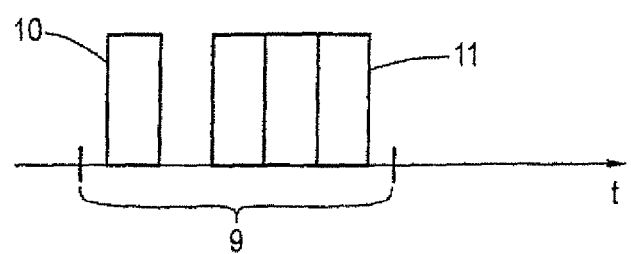

Steps 7 and 8 thus result in a measurement cycle 9 which is schematically shown in FIG. 3, wherein the order of the phase shift measurement and the runtime measurement is ultimately irrelevant, which is why FIG. 3 first shows the runtime measurement 10 and subsequently the phase shift measurement 11 with three proportions for three modulation frequencies.

In a step 12, it is then tested, whether a reflected individual signal was received in step 8 within the time interval. When this is the case it is assumed that measured phase shifts of the respective pixel do not originate from the exclusion range 6, but from the detection range 4, so that in a step 13 a distance is determined as it is generally known from the at least one phase shift. When on the other hand no reflected individual signal is measured within the time interval, the phase shifts for this pixel are discarded, step 14.

Irrespective of the result of the examination, the next measurement cycle is then initiated, arrow 15.

Figure 4:
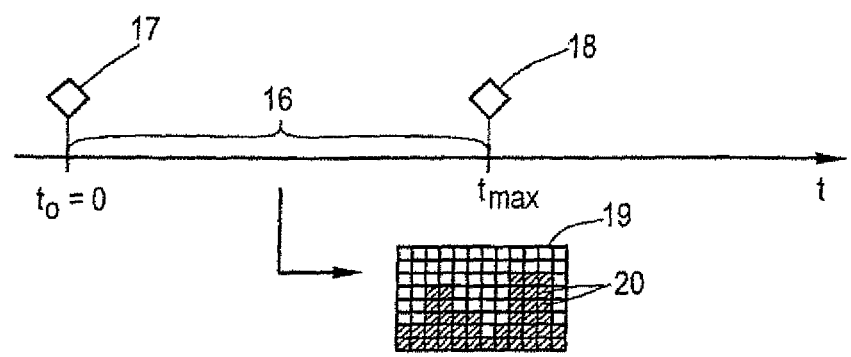

The principle of the invention is again explained in more detail with reference to FIG. 4. There, the time interval 16 is shown from the time point 17 of emission of the individual signal until the time point 18, which, as described, correspondingly results from the duration $t_{max}$. This measurement is performed for each pixel, so that, as schematically shown by way of the detector surface 19 with different pixels 20, the decision is made for each pixel 20 in step 9 whether a distance is determined from its at least one phase shift. FIG. 4 exemplary shows pixels 20 in a hatched marking, for which a reflected individual signal was received within the time interval 16.

As described, the method according to the invention allows minimizing the requirements for the detection range 4 and therefore configuring the measurement process more flexible with regard to the phase shifts. As a result, fewer modulation frequencies can be used, whereby it is also conceivable, however, to nevertheless use multiple modulation frequencies, which then have higher values and thus allow a more efficient measurement. When multiple modulation frequencies are used, at least two of the phase shifts of these modulation frequencies can be used for the determination of distances; additionally or alternatively it is however also conceivable to use at least one modulation frequency or its measured phase shift to verify a distance determined from the phase shifts assigned to the other modulation frequencies.

Finally it is noted that in step 8 of the process, also an amplitude of the reflected individual signal can be measured. This amplitude provides information regarding whether the amplitude of the emitted individual signal lies within an appropriate value range or whether the exposure control, also regarding the measurement signals, can be adjusted. When for example reflected individual signals that originate from the detection range 4 are measured with very high amplitude, this indicates that the luminosity in the signal source is set too high and can be reduced. Other conclusions can of course also be drawn from the amplitude.

Figure 5:
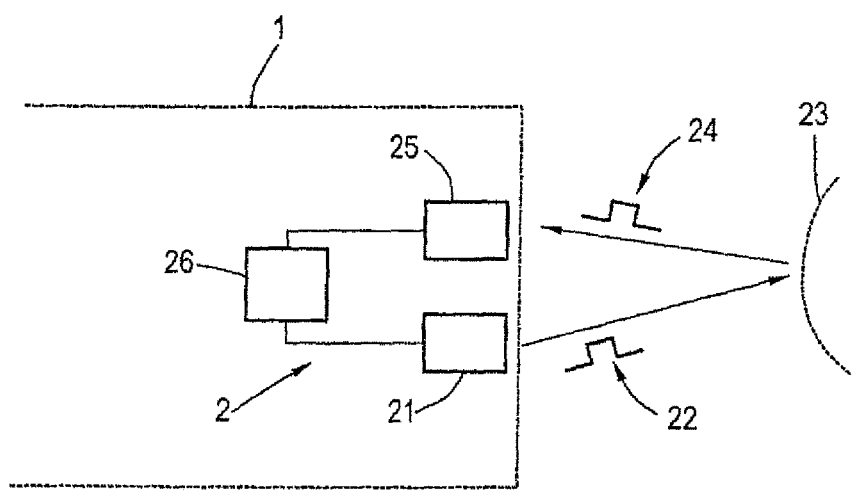

FIG. 5 shows a schematic diagram of the PMD sensor 2 installed in the motor vehicle, which is only schematically shown. As generally known, the PMD sensor incudes a signal source 21 that can include at least one LED to generate the corresponding light signal. A signal 22 emitted from the signal source 21 is reflected on an only schematically shown object 23, so that a reflected signal 24 can be received within a detection device 25, here a camera, of the PMD sensor 2. The control of the components 21, 25 and the evaluation of the measurements take place within a control device 26, which is correspondingly configured to implement the method according to the invention.

Figure 6:
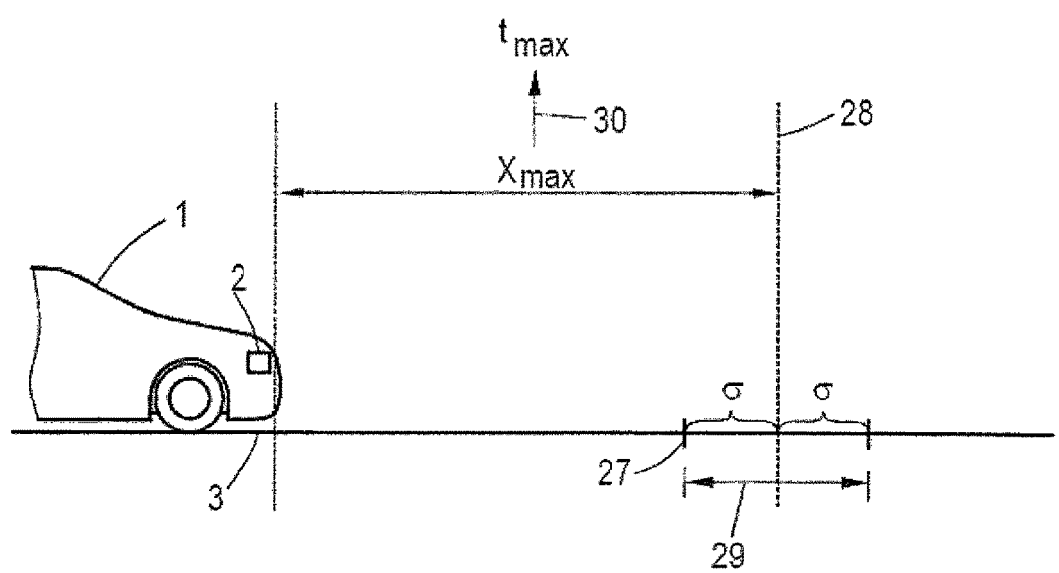

FIG. 6 illustrates in more detail how the time interval 16 can be dimensioned as a function of the desired predetermined target detection range 27, and as a result, the time $x_{max}$ defining the end of the time interval 16 can be determined. As illustrated in FIG. 6, possible inaccuracies in the measurement can be described by the standard deviations σ. If $x_{max}$ is selected in such a way that a distance region 29, extending by a corresponding distance 28 from the PMD sensor 2, and adjoins the predetermined target detection range 27 with the extension 2σ, and uses the expansion $t_{max}$ of the time interval resulting from the above-mentioned formula (arrow 30), the predetermined target detection range 27 lies just at the edge of the distance region 29. This includes the standard deviations, so that the number of measurement errors can be minimized.

What is claimed is:

1. A method to determine a distance of an object to a motor vehicle using a PMD sensor, comprising the steps of:
   in a measurement cycle measuring a phase shift of a measurement signal reflected on the object for at least one modulation frequency, wherein the modulation frequency is selected so that in a detection range beginning at the motor vehicle a distance is determinable from the phase shift;
   subsequent to the measuring of the phase shift, performing a runtime measurement for an individual signal reflected on the object during a time interval beginning at a first time point at which the individual signal is emitted and ending at a second time point corresponding to a time required by the individual signal to travel twice the detection range, wherein the second time point defining the end of the time interval is determined by taking into account measurement inaccuracies and a predetermined target detection range, the predetermined target detection range being a range in which an object is located, so that a distance range is a range determined by calculation of standard deviations, lies outside the predetermined target detection range, such that the predetermined target detection range is located within a detection range;
   when the reflected individual signal is measured during the time interval, determining a distance from the phase shift; and
   when the reflected individual signal is not measured during the time interval, discarding the phase shift without determining a distance.

2. The method of claim 1, wherein the distance range defined by the standard deviations adjoins the detection range.

3. The method of claim 1, wherein the phase shift is measured for plural modulation frequencies.

4. The method of claim 1, wherein the at least one modulation frequency is used to define the detection range.

5. The method of claim 1, wherein the at least one modulation frequency is used for validating a distance determined as a function of the phase shift.

6. The method of claim 1, wherein an amplitude of the individual signal is measured in the runtime measurement, and wherein the amplitude is taken into account for controlling an exposure during emission of the measurement signal and/or during emission of a further individual signal.

7. The method of claim 1, wherein the predetermined target detection is between at least 500 m to 700 m.

8. A PMD sensor, comprising a control device configured for implementing a method to determine a distance of an object to a motor vehicle using the PMD sensor, comprising the steps of:
   in a measurement cycle measuring a phase shift of a measurement signal reflected on the object for at least one modulation frequency, wherein the modulation frequency is selected so that in a detection range beginning at the motor vehicle a distance is determinable from the phase shift;
   subsequent to the measuring of the phase shift, performing a runtime measurement for an individual signal reflected on the object during a time interval beginning at a first time point at which the individual signal is emitted and ending at a second time point corresponding to a time required by the individual signal to travel twice the detection range, wherein the second time point defining the end of the time interval is determined by taking into account measurement inaccuracies and a predetermined target detection range, the predetermined target detection range being a range in which an object is located, so that a distance range is a range determined by calculation of standard deviations, lies outside the predetermined target detection range, such that the predetermined target detection range is located within a detection range;
   when the reflected individual signal is measured during the time interval, determining a distance from the phase shift; and
   when the reflected individual signal is not measured during the time interval, discarding the phase shift without determining a distance.

* * * * *